(12) United States Patent
Kraemer

(10) Patent No.: US 10,490,954 B1
(45) Date of Patent: Nov. 26, 2019

(54) EMI HARDENED DISPLAYPORT INTERFACE

(71) Applicant: Rockwell Collins, Inc., Cedar Rapids, IA (US)

(72) Inventor: John G. Kraemer, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 387 days.

(21) Appl. No.: 15/400,470

(22) Filed: Jan. 6, 2017

(51) Int. Cl.
| | |
|---|---|
| *H01R 13/66* | (2006.01) |
| *H04B 1/04* | (2006.01) |
| *H04B 1/16* | (2006.01) |
| *G06F 13/42* | (2006.01) |

(52) U.S. Cl.
CPC ..... *H01R 13/6633* (2013.01); *G06F 13/4282* (2013.01); *H01R 13/665* (2013.01); *H04B 1/04* (2013.01); *H04B 1/16* (2013.01)

(58) Field of Classification Search
CPC .... H01R 13/6633; H01R 13/665; H04B 1/04; H04B 1/16; G06F 13/4282
See application file for complete search history.

(56) References Cited

U.S. PATENT DOCUMENTS

| | | | | |
|---|---|---|---|---|
| 4,414,435 A | * | 11/1983 | Parlor | H04M 19/003 379/398 |
| 5,361,409 A | * | 11/1994 | Vice | H03D 7/1441 327/113 |
| 5,574,411 A | * | 11/1996 | Apel | H03H 7/42 333/25 |
| 7,915,898 B1 | * | 3/2011 | Kraemer | G01R 31/001 324/527 |
| 8,462,759 B2 | * | 6/2013 | Shakiba | H04L 25/0264 370/344 |
| 9,071,229 B1 | | 6/2015 | Ji | |
| 2009/0298335 A1 | * | 12/2009 | Rotta | H01R 9/034 439/607.01 |
| 2010/0081302 A1 | * | 4/2010 | Atkinson | H01R 13/6474 439/98 |
| 2015/0134985 A1 | | 5/2015 | Gopal et al. | |

* cited by examiner

*Primary Examiner* — Henry Tsai
*Assistant Examiner* — John B Roche
(74) *Attorney, Agent, or Firm* — Suiter Swantz pc llo

(57) ABSTRACT

An EMI-hardened multimedia interface device compatible with high-speed DisplayPort data transmission incorporates coupled isolation transformers on the source and sink sides for transmitting high-pass DisplayPort main data lane signals across a shielded cable assembly. The multimedia interface includes a bidirectional auxiliary data channel with source-side and sink-side isolation transformers. An extended-range EMI hardened interface device may prevent signal loss over longer cable runs by using the transformer in a BALUN configuration and utilizing coaxial cabling and source-side RF amplifiers to boost high-frequency gain. Interface devices may incorporate source-side and sink-side BALUNs or tri-filar RF transformers with AC coupling via serial capacitors to improve efficiency at high frequencies.

20 Claims, 4 Drawing Sheets

EMI HARDENED DISPLAYPORT INTERFACE

BACKGROUND

DisplayPort is a new digital display interface developed by the Video Electronics Standards Association (VESA) as a replacement for existing Video Graphics Array (VGA), Digital Visual Interface (DVI), High Definition Multimedia Interface (HDMI), and Flat Panel Display Link (FPD-Link) interfaces. Currently the DisplayPort interface is targeted to commercial and consumer-grade environments providing for short cable runs under 3 meters. Such limitations on cable length make implementation of the DisplayPort interface in defense and aerospace platforms difficult. Further, the DisplayPort interface may be susceptible to the radio frequency (RF) environment associated with defense and aerospace applications, which is generally orders of magnitude more severe when compared to the standard commercial and consumer environments and their associated requirements. Similarly, the DisplayPort interface may radiate RF emissions at levels deemed unacceptable for equipment on defense/aerospace platforms.

SUMMARY

In one aspect, embodiments of the inventive concepts disclosed herein are directed to a multimedia interface device hardened to resist electromagnetic interference (EMI). The device may include a source connector linkable to an avionics graphics processor or other like source device, and a sink connector linkable to an avionics display unit or other like sink device. The device may include one or more main data channels, e.g., four main DisplayPort channels, each main data channel including a source transformer coupled to a sink transformer, the coupled transformers configured to transmit balanced signals converted from DisplayPort differential signals through a shielded wire pair for reconversion into differential signals by the sink transformer. The device may include a bidirectional auxiliary data channel including a coupled third and fourth transformer for transmitting auxiliary signals between the source and sink devices as converted balanced signals over a second shielded wire pair. The device may include a cable assembly within which the main-channel and auxiliary-channel shielded wire pairs are housed. The device may include an overbraid-shielded coaxial cable assembly within which the main-channel and auxiliary-channel shield pair cables are housed.

In a further aspect, embodiments of the inventive concepts disclosed herein are directed to an extended-range EMI-hardened multimedia interface device. The device may include source and sink connectors connectible to source and sink devices respectively. The device may include one or more main data channels, each main data channel including a pair of coupled transformers, implemented as balanced/unbalanced (BALUN) transformers, associated respectively with the source and sink connectors. Each main data channel may include an RF amplifier for adjusting the gain and pre-emphasizing the single-ended (unbalanced) signal from the source transformer. Each main data channel may include a coaxial cable for transmitting the pre-emphasized signal from the source to the sink connector for reconversion to differential format. The device may include a bidirectional auxiliary data channel including a coupled third and fourth BALUN for transmitting auxiliary signals between the source and sink devices. The auxiliary data channel may include RF amplifiers at the source and sink ends for pre-emphasizing the auxiliary single-ended (unbalanced) signals from the source and sink transformers for transmission between the source and sink devices via coaxial cable. The device may include an overbraid-shielded coaxial cable assembly within which the main-channel and auxiliary-channel coaxial cables are housed. The device may also include automatic frequency dependent gain adjustment for the included RF amplifiers, the adjustment being determined by signal levels and/or data analysis results at the sink, and subsequent communication of needed adjustment parameters to the source via the auxiliary-channel. Alternatively, the automatic frequency dependent gain adjustment parameters may be determined by the characteristics of the auxiliary-channel signal as received at the source.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
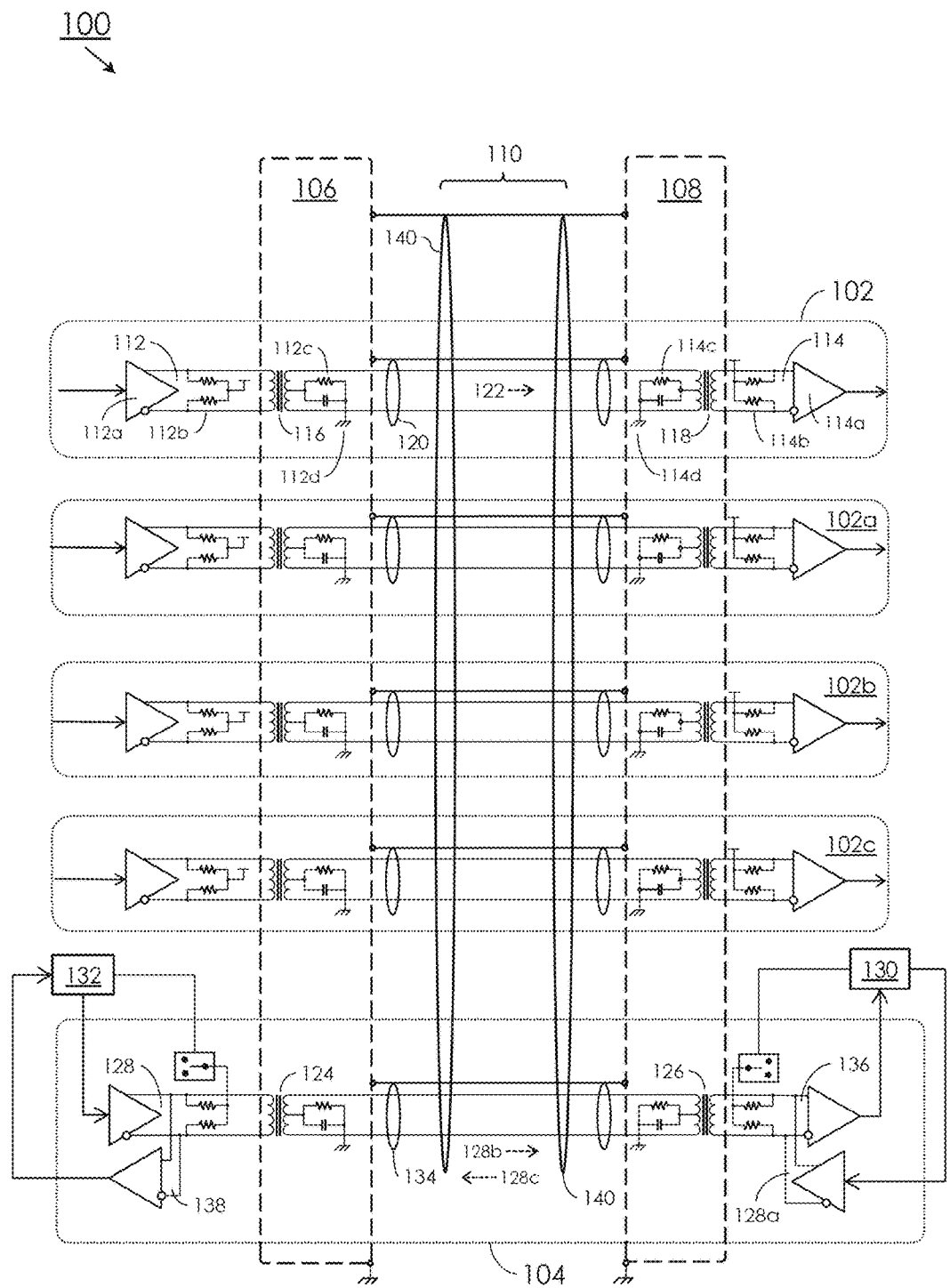
FIG. 1 illustrates an exemplary embodiment of a multimedia interface device according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an electromagnetic interference (EMI)-hardened multimedia interface device compatible with the new DisplayPort standard and the associated high data rates. Devices according to embodiments of the inventive concepts disclosed herein may enable high-speed data transmission via the DisplayPort standard to be integrated into defense and aerospace platforms by allowing for longer cable lengths than commercial or consumer-grade equipment for which the DisplayPort standard is currently configured, while providing two-way protection of the defense/aerospace environment by increasing immunity to external RF interference and reducing RF emissions from the interface itself.

Referring to FIG. 1, an exemplary embodiment of an EMI-hardened multimedia interface device 100 according to the inventive concepts disclosed herein may include one or more main data channels 102 (e.g., four DisplayPort main data lanes 0-3) and an auxiliary data channel 104 which may be situated within, or at, a source connector 106, a sink connector 108, a shielded cable assembly 110 linking the source connector to the sink connector, or within the connected source and sink devices. The source connector 106 may removably connect to an avionics graphics processing unit, computing device, or similar source device, while the sink connector 108 may removably connect to a display unit (e.g., an avionics display panel) or other sink device configured to receive, process, or display data transmitted via the EMI-hardened multimedia interface device 100. For example, each main data channel 102 of the source connector 106 may connect to the differential output signal (112) of a DisplayPort source device, which may include differential amplifiers 112a, bias resistors 112b, and other related components. Similarly, the sink connector 108 may output the DisplayPort-compatible differential output signal (114) to sink-side components (e.g., differential amplifiers 114a and bias resistors 114b) of the sink device. The transformer coupling may reduce EMI susceptibility by breaking the common-mode loop, and may reduce radiated EMI emissions that would typically be caused by intra-pair skew commonly seen in differential interfaces. The transformer coupling may include transformers with resistors and capacitors (112c, 114c) connected from a center tap on the external cable end to chassis ground (112d, 114d) to direct the flow of common mode current as a function of frequency (to improve the overall common mode rejection).

Each main data channel 102 may break the common-mode EMI loop characteristic of a standard DisplayPort interface via transformer coupling. Transformer coupling may include the use of transformers along with terminating components at the transformers' center taps. For example, each main data channel 102 may include a source isolation transformer 116 coupled to a sink isolation transformer 118 by a shielded wire pair 120 housed within the shielded cable assembly 110. The source isolation transformer 116 and the sink isolation transformer 118 (and their associated components 112c-d, 114c-d) may be respectively situated within the source connector 106 and sink connector 108, or on the circuit board(s) hosting the standard DisplayPort circuits, although this need not be the case; other configurations may be implemented without affecting transformer coupling. Data transmitted by the main data channel 102 (e.g., encoded DisplayPort data (112) transmitted at 1.62, 2.7, 5.4, or 8.1 Gbps data rates) may be characterized by an 8B/10B encoded, DC-balanced signal and thus well suited to transformer coupling. The balanced transformer-coupled signal (122) may be converted back to a DisplayPort format differential-mode output signal (114) by the sink isolation transformer 118. In some embodiments, e.g., an EMI-hardened multimedia interface device 100 configured for DisplayPort, the EMI-hardened multimedia interface device may include main data channels 102a-c (corresponding to DisplayPort data lanes 1-3) in addition to, and implemented similarly to, the main data channel 102 (corresponding to DisplayPort data lane 0).

The bidirectional auxiliary data channel 104 may similarly include an auxiliary source isolation transformer 124 (and associated components) coupled to an auxiliary sink isolation transformer 126 (and associated components). For example, auxiliary channel data, including auxiliary source-to-sink differential signals (128) and auxiliary sink-to-source differential signals (128a) (e.g., feedback from a sink processor 130 of the sink device), may be transmitted at lower data rates than the high speed data transmitted by main data channels 102, 102a-c. However, auxiliary channel data traveling in either direction may similarly be 8B/10B encoded, or Manchester encoded, and therefore may be similarly DC-balanced and suitable for transformer coupling. The auxiliary source isolation transformer 124 may convert source-to-sink auxiliary differential signals (128) generated by the source processor 132 of the source device to balanced transformer-coupled signals (128b) for transmission to the sink device (via an auxiliary shielded wire pair 134), where the auxiliary sink isolation transformer 126 converts the received balanced signals (128b) back to auxiliary differential output signals (136), e.g., for processing or analysis by the sink processor 130. Similarly, the auxiliary sink isolation transformer 126 may convert auxiliary sink-to-source differential signals 128a (e.g., feedback data) generated by the sink processor 130 of the sink device to balanced transformer-coupled signals (128c) for transmission to the source device (via the auxiliary shielded wire pair 134), where the auxiliary source isolation transformer 124 may convert the received balanced signals (128c) back to auxiliary differential output signals (138).

To reduce interference-induced currents on the shields of the shielded pair cables 120, 134, which may subsequently couple noise to the conductors carrying the signal (e.g., the balanced main-channel signal 122 and balanced auxiliary-channel signals 128b, 128c), gross overbraid shielding (140) may be bonded to the chassis or grounding structure of source-side and sink-side equipment, e.g., the source connector 106 and sink connector 108. The gross overbraid shielding 140, in conjunction with the shielded data wire pairs (120, 134) and transformer coupling provided by the source isolation transformers (116, 124) and the sink isolation transformers (118, 126) may provide an estimated 40-50 dB of improved RF immunity over the standard DisplayPort interface while reducing RF emissions to within defense/aerospace EMI control standards, allowing for longer cable lengths within the shielded cable assembly 110 (compared to the 3-meter limit on cable lengths associated with the standard DisplayPort interface).

Figure 2:
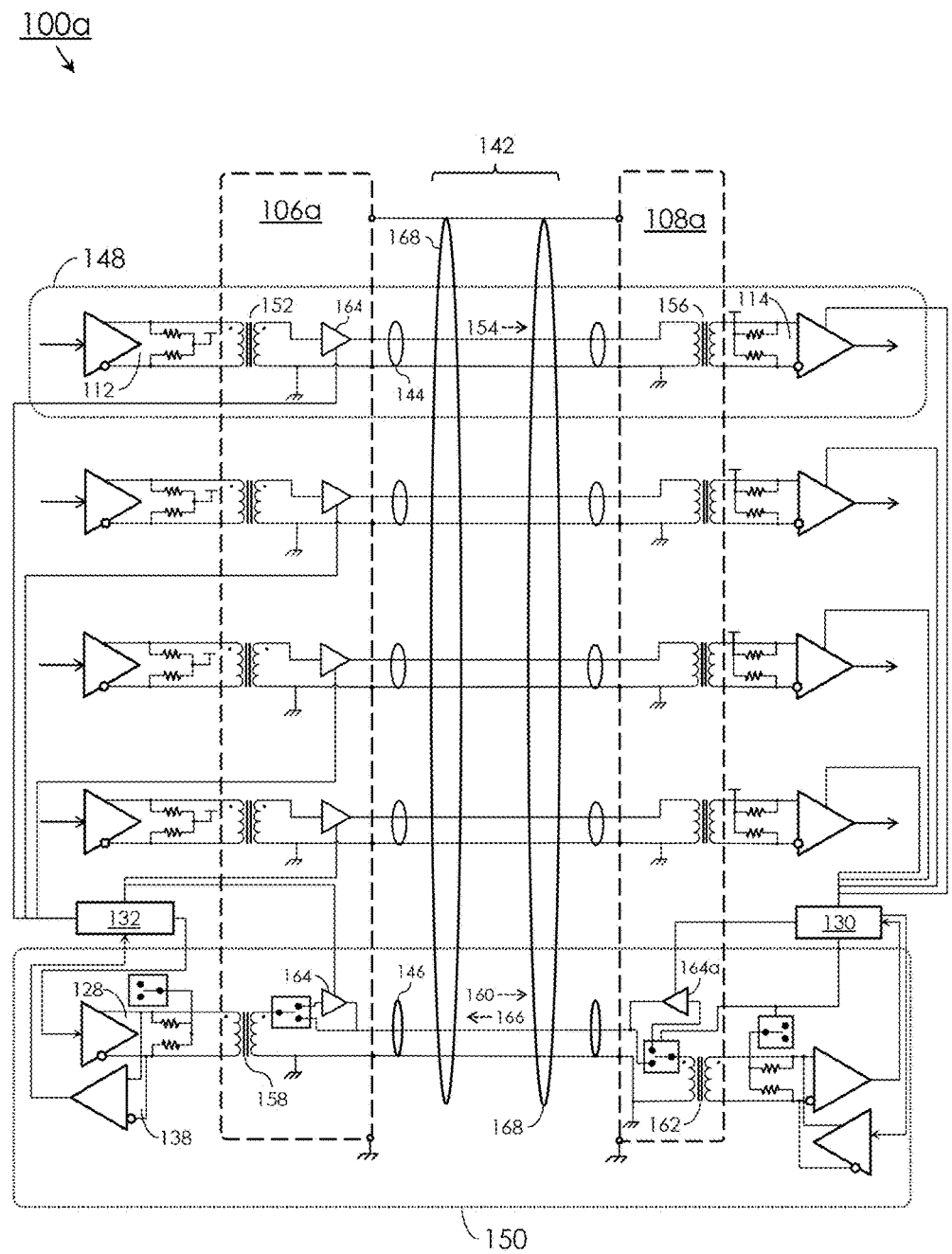
FIG. 2 illustrates an exemplary embodiment of an extended-range multimedia interface device.

Referring now to FIG. 2, an extended-range EMI-hardened multimedia interface device 100a may be implemented and may function similarly to the EMI-hardened interface device 100 of FIG. 1, except that the extended-range EMI-hardened multimedia interface device 100a may incorporate a coaxial cable assembly 142 for transporting data between the source and sink devices. The coaxial cable assembly 142 may include coaxial cables 144, 146 for each main data channel 148 and auxiliary data channel 150 respectively. The source connector 106a and sink connector 108a may be implemented and may function similarly to the source connector 106 and sink connector 108 of FIG. 1, except that the source connector 106a and sink connector 108a may include coaxial connectors or coaxial contacts within a larger connector assembly.

At high frequencies associated with the high data rates at which DisplayPort data is transmitted, signal loss may become excessive over shielded wire pairs (e.g., the shielded wire pairs 120, 134 of the EMI-hardened multimedia interface device 100, FIG. 1). While the EMI-hardened multimedia interface device 100 may enable passive cable lengths above 3 meters due to the reduced EMI currents and interferences noted above, at longer cable lengths the signal losses associated with high frequencies may become more significant at higher data rates, e.g., the 8.1 Gbps maximum rate supported by current DisplayPort implementations (as opposed to a 1.62 Gbps standard data rate). In addition, standard 2-winding, isolated-winding, wideband, high-frequency coupling transformers, e.g., the source isolation transformers (116, 124) and sink isolation transformers (118, 126) of FIG. 1, may not be sufficiently low-loss for optimal use with the extended-range EMI-hardened multimedia interface device 100a.

Accordingly, the main data channels (148) and auxiliary data channels (150) of the extended-range EMI-hardened multimedia interface device 100a may incorporate unbalanced data interfaces using a transformer implemented as a BALUN (BALanced/UNbalanced) transformer, the BALUN transformer configuration providing EMI-hardening by reducing common mode emissions and increasing immunity to EMI. For example, a source BALUN transformer 152 in the main data channel 148 (which may be situated within or at the source connector 106a) may convert the differential signal 112 generated by the source device into a single-ended (unbalanced) main-channel signal (154) for transmission across the main-channel coaxial cable 144 to a sink BALUN transformer 156 (which may be situated within or at the sink connector 108a). Similarly, an auxiliary source BALUN 158 (which may be situated within or at the source connector 106a) may convert the source-to-sink auxiliary differential signal 126 into a source-to-sink auxiliary single-ended signal 160 for transmission across the auxiliary-channel coaxial cable 146 to an auxiliary sink BALUN 162.

Each main data channel 148 and auxiliary data channel 150 may include a source-side RF amplifier (164) to provide pre-emphasis of the single-ended main-channel signal 154 or source-to-sink auxiliary single-ended signal 160, guarding against any signal loss associated with the coaxial cables 144, 146 (longer cable runs may be associated with predictably required greater amplifier gain and pre-emphasis). As greater signal losses may occur at the high frequency end of the spectrum, the source-side RF amplifier 164 may employ pre-emphasis to boost gain at the high-frequency end of the spectrum. The auxiliary data channel 150, being a bidirectional channel, may include an auxiliary sink-side RF amplifier 164a (which may be situated within or at the sink controller 108a) for providing pre-emphasis to single-ended auxiliary-channel signals (166) produced by the auxiliary sink BALUN 162 for transmission across the auxiliary-channel coaxial cable 146 to the source device. To reduce interference-induced currents on the shields of the coaxial cables 144, 146, which may subsequently couple noise to the center conductor carrying the signal (e.g., the single-ended main-channel signal 154 or auxiliary single-ended signals 160, 166), gross overbraid shielding (168) may be bonded to the chassis or grounding structure of source-side and sink-side equipment, e.g., the source connector 106a, sink connector 108a, and/or coaxial cable assembly 142. Automatic frequency-dependent gain adjustment for source side and sink-side RF amplifiers 164, 164a, as well as pre-emphasis characteristics, may be controlled and adjusted by the source processor 132 or sink processor 130. For example, the sink processor 130 may perform data analysis or analysis of the received main-channel differential output signals (114) on the sink side, communicating any necessary adjustment parameters to the source processor 132 via the auxiliary data channel 150. Alternatively, the source processor 132 may determine automatic frequency dependent gain adjustment parameters based on the characteristics of the received auxiliary-channel signal (e.g., auxiliary sink-to-source single ended signals (166) converted back to differential format (138) by the auxiliary source BALUN 158 in the auxiliary data channel 150).

Figure 3A:
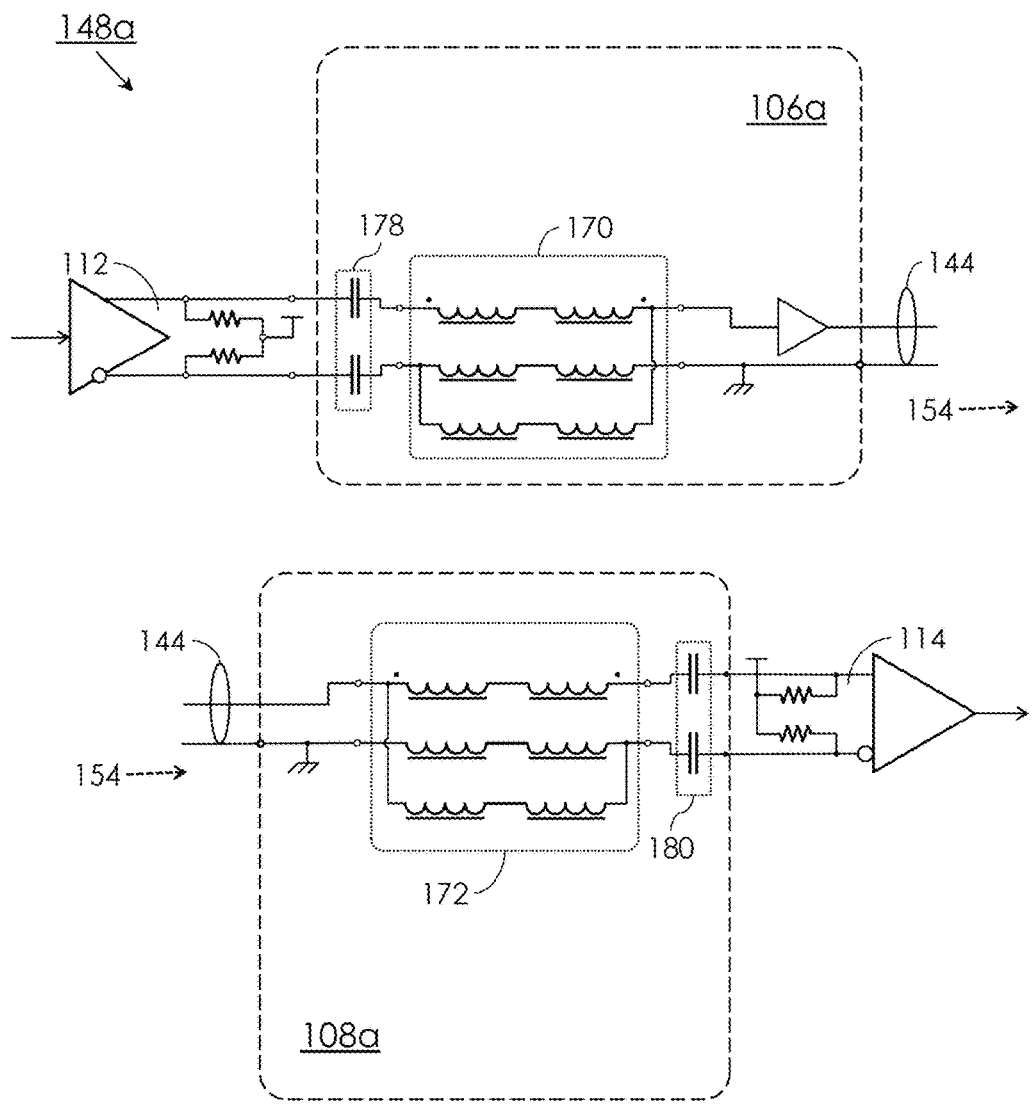
FIGS. 3A and 3B illustrate tri-filar transformer components of an embodiment of the multimedia interface device of FIG. 2.
Figure 3B:
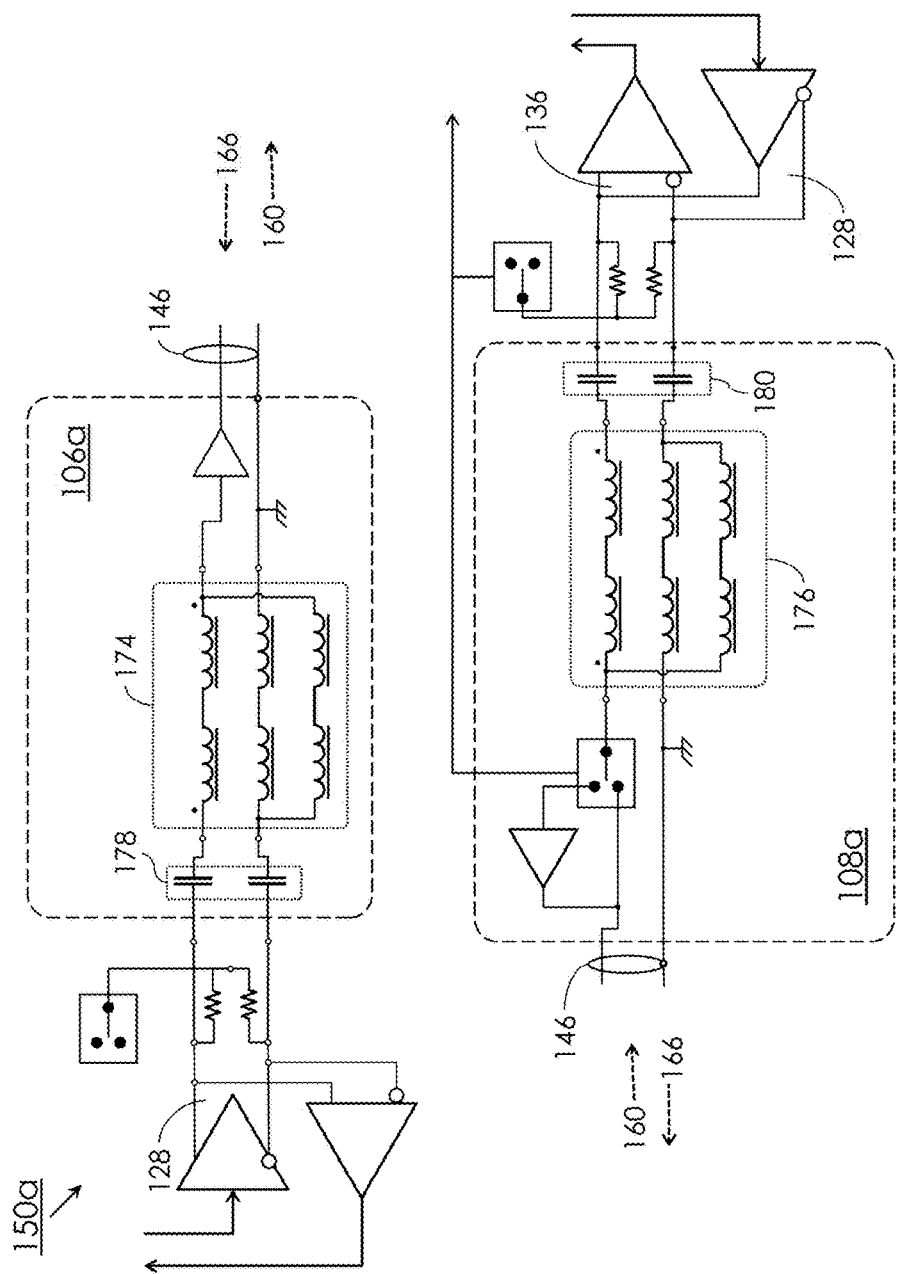

Referring to FIGS. 3A and 3B, the main data channel 148a and auxiliary data channel 150a may be implemented and may function similarly to the main data channel 148 and auxiliary data channel 150 of FIG. 2, except that the main data channel 148a and auxiliary data channel 150a may include, referring in particular to FIG. 3A, source-side non-DC isolated tri-filar RF transformers 170 and sink-side non-DC isolated tri-filar RF transformers 172 instead of the isolated primary-secondary main data channel source BALUN 152 and sink BALUN 156, and, referring in particular to FIG. 3B, auxiliary source-side non-DC isolated tri-filar RF transformers 174 and auxiliary sink-side non-DC isolated tri-filar RF transformers 176 instead of the isolated primary-secondary auxiliary source BALUN 158 and auxiliary sink BALUN 162 of the auxiliary data channel 150. The main-channel source-side and sink-side non-DC isolated tri-filar RF transformers 170, 172 and auxiliary-channel source-side and sink-side non-DC isolated tri-filar RF transformers 174, 176 may provide more efficient transformer coupling at higher frequencies, and thus more efficient operation of the extended-range EMI-hardened DisplayPort interface device 100a, at the higher data rates associated with DisplayPort data transmission. The main-channel and auxiliary-channel source-side non-DC isolated tri-filar RF transformer 170, 174 and main-channel and auxiliary-channel sink-side non-DC isolated tri-filar RF transformers 172, 176 may provide alternating-current (AC) coupling via source-side series capacitors 178 and sink-side series capacitors 180. AC coupling may enhance EMI immunity via galvanic isolation of the source equipment and sink equipment circuits, e.g., with respect to the main-channel single-ended signals 154 and auxiliary-channel single-ended signals 160, 166 transmitted over the coaxial cables 144, 146.

As will be appreciated from the above, systems and methods according to embodiments of the inventive concepts disclosed herein may enable high-speed data transmission via the DisplayPort standard to be integrated into defense and aerospace platforms by allowing for longer cable lengths than consumer- and commercial-grade equipment for which the DisplayPort standard is currently configured, while providing two-way protection in defense/aerospace environments by increasing immunity to external RF interference and reducing RF emissions from the interface itself.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. An electromagnetic interference (EMI)-hardened interface device, comprising:
   a source connector couplable to at least one source device;
   a sink connector couplable to at least one sink device;
   at least one main data channel comprising:
      a first isolation transformer associated with the source connector, the first isolation transformer configured to convert a first differential signal generated by the source device into a first balanced signal;
      a second isolation transformer associated with the sink connector, the second isolation transformer configured to receive the first balanced signal and convert the first balanced signal to a second differential signal;
      and
      a first shielded wire pair coupling the first isolation transformer to the second isolation transformer;
   and
   at least one auxiliary data channel comprising:
      a third isolation transformer associated with the source connector, the third isolation transformer configured
      to a) convert a third differential signal generated by the source device to a second balanced signal and c) convert a third balanced signal received from the sink device to a fourth differential signal; and
      a fourth isolation transformer associated with the sink connector, the fourth isolation transformer configured to a) receive the second balanced signal from the third isolation transformer, b) convert the second balanced signal to a fifth differential signal, and b) convert a sixth differential signal generated by the sink device to the third balanced signal;
      and
      a second shielded wire pair coupling the third isolation transformer to the fourth isolation transformer;
   and
   at least one cable assembly coupling the source connector to the sink connector, the at least one cable assembly configured to:
      transmit the at least one first balanced signal from the first isolation transformer to the second isolation transformer via the at least one first shielded wire pair;
      transmit the at least one second balanced signal from the third isolation transformer to the fourth isolation transformer via the at least one second shielded wire pair;
      and
      transmit the at least one third balanced signal from the fourth isolation transformer to the third isolation transformer via the at least one second shielded wire pair.

2. The EMI-hardened interface device of claim 1, wherein the interface device is a DisplayPort interface device and wherein the at least one main data channel includes a first main data channel, a second main data channel, a third main data channel, and a fourth main data channel.

3. The EMI-hardened interface device of claim 1, wherein:
   the at least one first isolation transformer includes at least one first balanced/unbalanced transformer (BALUN) configured to convert the at least one first differential signal to a first single-ended signal;
   the at least one second isolation transformer includes at least one second BALUN configured to convert the at least one first single-ended signal to the second differential signal;
   the at least one third isolation transformer includes at least one third BALUN configured to a) convert the at least one third differential signal to a second single-ended signal and b) convert at least one third single-ended signal to the fourth differential signal;
   and
   the at least one fourth isolation transformer includes at least one fourth BALUN configured to a) convert the at least one second single-ended signal to the fifth differential signal and b) convert the at least one sixth differential signal to the third single-ended signal.

4. The EMI-hardened interface device of claim 3, wherein:
   the at least one first BALUN includes at least one first tri-filar radio frequency (RF) transformer;
   the at least one second BALUN includes at least one second tri-filar RF transformer;
   the at least one third BALUN includes at least one third tri-filar RF transformer; and
   the at least one fourth BALUN includes at least one fourth tri-filar RF transformer.

5. The EMI-hardened interface device of claim 4, further comprising:
at least one first capacitor serially coupled to the source device and to the first tri-filar RF transformer; and
at least one second capacitor serially coupled to the sink device and to the second tri-filar RF transformer;
at least one third capacitor serially coupled to the source device and to the third tri-filar RF transformer; and
at least one fourth capacitor serially coupled to the sink device and to the fourth tri-filar RF transformer.

6. The EMI-hardened interface device of claim 3, further comprising:
at least one first radio frequency (RF) amplifier coupled to the first BALUN, the at least one first RF amplifier configured to generate at least one first pre-emphasized signal based on the first single-ended signal;
at least one second RF amplifier coupled to the third BALUN, the at least one second RF amplifier configured to generate at least one second pre-emphasized signal based on the second single-ended signal;
and
at least one third RF amplifier coupled to the fourth BALUN, the at least one third RF amplifier configured to generate at least one third pre-emphasized signal based on the third single-ended signal;
the at least one second BALUN configured to convert the at least one first pre-emphasized signal to the second differential signal;
the at least one third BALUN configured to convert the at least one third pre-emphasized signal to the fourth differential signal;
and
the at least one fourth BALUN configured to convert the at least one second pre-emphasized signal to the fifth differential signal.

7. The EMI-hardened interface device of claim 6, further comprising:
at least one source processor associated with the source connector, the at least one source processor coupled to the at least one first RF amplifier, and the at least one third BALUN, the at least one source processor configured to determine at least one of a first gain level and a first pre-emphasis level based on the received fourth differential signal;
and
the at least one first RF amplifier is configured to generate the at least one first pre-emphasized signal based on one or more of the determined first gain level and the determined first pre-emphasis level.

8. The EMI-hardened interface device of claim 7, further comprising:
at least one sink processor associated with the sink connector, the at least one sink processor coupled to the one or more of the at least one third RF amplifier, the at least one second BALUN, and the at least one fourth BALUN and configured to:
determine one or more of a second gain level and a second pre-emphasis level based on the at least one received second differential signal;
transmit one or more of the determined second gain level and the determined second pre-emphasis level to the source processor via the at least one auxiliary data channel;
and
receive one or more of the determined first gain level and the determined first pre-emphasis level from the at least one source processor via the at least one auxiliary data channel;
wherein
the at least one first RF amplifier is configured to generate the at least one first pre-emphasized signal based on one or more of the determined second gain level and the determined second pre-emphasis level;
and
the at least one third RF amplifier is configured to generate the at least one second pre-emphasized signal based on one or more of the determined first gain level and the determined first pre-emphasis level.

9. The EMI-hardened interface device of claim 3, wherein:
the at least one first shielded wire pair includes at least one first coaxial cable coupled to the source connector by a first coaxial connector and coupled to the sink connector by a second coaxial connector;
the at least one second shielded wire pair includes at least one second coaxial cable coupled to the source connector by a third coaxial connector and coupled to the sink connector by a fourth coaxial connector;
and
the at least one cable assembly is configured to:
transmit the at least one first balanced signal from the first isolation transformer to the second isolation transformer via the at least one first coaxial cable;
transmit the at least one second balanced signal from the third isolation transformer to the fourth isolation transformer via the at least one second coaxial cable;
and
transmit the at least one third balanced signal from the fourth isolation transformer to the third isolation transformer via the at least one second coaxial cable.

10. The EMI-hardened interface device of claim 1, wherein the at least one cable assembly has a length of at least 3 meters.

11. The EMI-hardened interface device of claim 1, wherein the EMI-hardened interface device is embodied in an aircraft avionics system and the at least one sink device includes at least one avionics display unit.

12. The EMI-hardened interface device of claim 1, further comprising:
gross overbraid shielding bonded to one or more of the source connector, the sink connector, and the at least one cable assembly.

13. An extended-range electromagnetic interference (EMI)-hardened interface device, comprising:
a source connector couplable to at least one source device;
a sink connector couplable to at least one sink device;
at least one main data channel comprising:
a first balanced/unbalanced transformer (BALUN) associated with the source connector, the first BALUN configured to convert a first differential signal generated by the source device into a first single-ended signal;
a first RF amplifier associated with the source connector, the first radio frequency (RF) amplifier coupled to the first BALUN and configured to generate at least one first pre-emphasized signal based on the first single-ended signal;
a second BALUN associated with the sink connector, the second BALUN configured to receive the first pre-emphasized signal and convert the first pre-emphasized signal to a second differential signal; and
a first coaxial cable coupling the first BALUN to the second BALUN;
and
at least one auxiliary data channel comprising:
a third BALUN associated with the source connector, the third BALUN configured to a) convert at least one third differential signal generated by the source device to a second single-ended signal and b) convert at least one second pre-emphasized signal to a fourth differential signal;
a second RF amplifier associated with the source connector, the second RF amplifier coupled to the third BALUN and configured to generate at least one third pre-emphasized signal based on the second single-ended signal;
a fourth BALUN associated with the sink connector, the fourth BALUN configured to a) receive the at least one third pre-emphasized signal, b) convert the third pre-emphasized signal into a fifth differential signal, and c) convert at least one sixth differential signal generated by the sink device into a third single-ended signal;
a third RF amplifier associated with the sink connector, the third RF amplifier coupled to the fourth BALUN and configured to generate the at least one second pre-emphasized signal based on the third single-ended signal;
and
a second coaxial cable coupling the third BALUN to the fourth BALUN;
and
at least one coaxial cable assembly coupling the source connector to the sink connector, the at least one coaxial cable assembly configured to:
transmit the at least one first single-ended signal from the first BALUN to the second BALUN via the at least one first coaxial cable;
transmit the at least one second single-ended signal from the third BALUN to the fourth BALUN via the at least one second coaxial cable;
and
transmit the at least one third single-ended signal from the fourth BALUN to the third BALUN via the at least one second coaxial cable.

14. The EMI-hardened interface device of claim 13, wherein the interface device is a DisplayPort interface device and wherein the at least one main data channel includes a first main data channel, a second main data channel, a third main data channel, and a fourth main data channel.

15. The EMI-hardened interface device of claim 13, wherein:
the at least one first BALUN includes at least one first tri-filar RF transformer;
the at least one second BALUN includes at least one second tri-filar RF transformer;
the at least one third BALUN includes at least one third tri-filar RF transformer; and
the at least one fourth BALUN includes at least one fourth tri-filar RF transformer.

16. The EMI-hardened interface device of claim 15, wherein:
at least one first capacitor serially coupled to the source device and to the first tri-filar RF transformer; and
at least one second capacitor serially coupled to the sink device and to the second tri-filar RF transformer;
at least one third capacitor serially coupled to the source device and to the third tri-filar RF transformer; and
at least one fourth capacitor serially coupled to the sink device and to the fourth tri-filar RF transformer.

17. The EMI-hardened interface device of claim 13, further comprising:
at least one source processor associated with the source connector, the at least one source processor coupled to the at least one first RF amplifier, and the at least one third BALUN, the at least one source processor configured to determine at least one of a first gain level and a first pre-emphasis level based on the received fourth differential signal; and
the at least one first RF amplifier is configured to generate the at least one first pre-emphasized signal based on one or more of the determined first gain level and the determined first pre-emphasis level.

18. The EMI-hardened interface device of claim 17, further comprising:
at least one sink processor associated with the sink connector, the at least one sink processor coupled to the one or more of the at least one third RF amplifier, the at least one second BALUN, and the at least one fourth BALUN and configured to:
determine one or more of a second gain level and a second pre-emphasis level based on the at least one received second differential signal;
transmit one or more of the determined second gain level and the determined second pre-emphasis level to the source processor via the at least one auxiliary data channel;
and
receive one or more of the determined first gain level and the determined first pre-emphasis level from the at least one source processor via the at least one auxiliary data channel;
wherein
the at least one first RF amplifier is configured to generate the at least one first pre-emphasized signal based on one or more of the determined second gain level and the determined second pre-emphasis level;
and
the at least one third RF amplifier is configured to generate the at least one second pre-emphasized signal based on one or more of the determined first gain level and the determined first pre-emphasis level.

19. The EMI-hardened interface device of claim 13, wherein the EMI-hardened interface device is embodied in an aircraft avionics system and the at least one sink device includes at least one avionics display unit.

20. The EMI-hardened interface device of claim 13, further comprising:
gross overbraid shielding bonded to one or more of the source connector, the sink connector, and the at least one coaxial cable assembly.

* * * * *